June 20, 1950  M. CALLEJO  2,512,479
BACKFLOW PREVENTER
Filed Feb. 17, 1949
2 Sheets-Sheet 1

INVENTOR
MODESTO CALLEJO
BY
ATTORNEY

June 20, 1950 M. CALLEJO 2,512,479
BACKFLOW PREVENTER
Filed Feb. 17, 1949 2 Sheets-Sheet 2
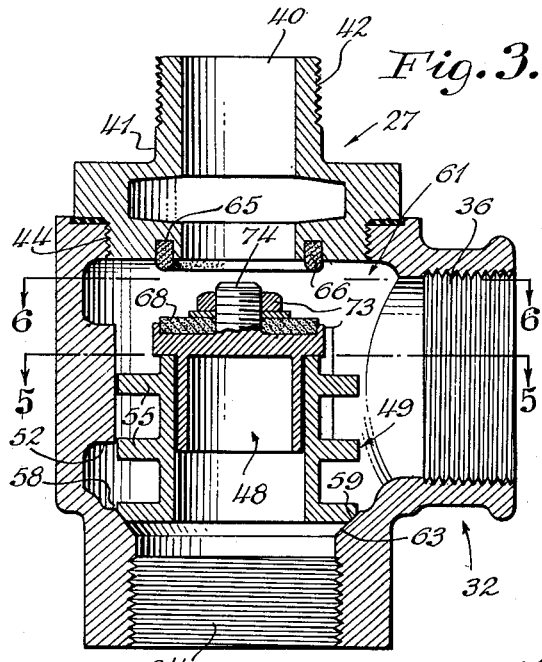
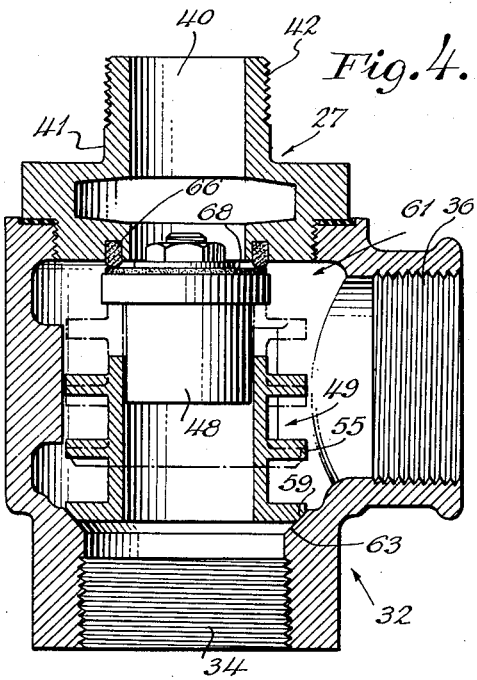
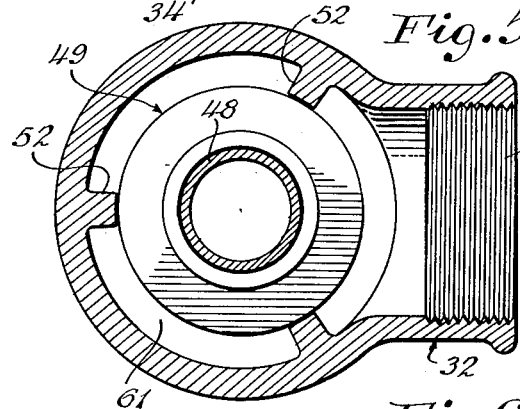
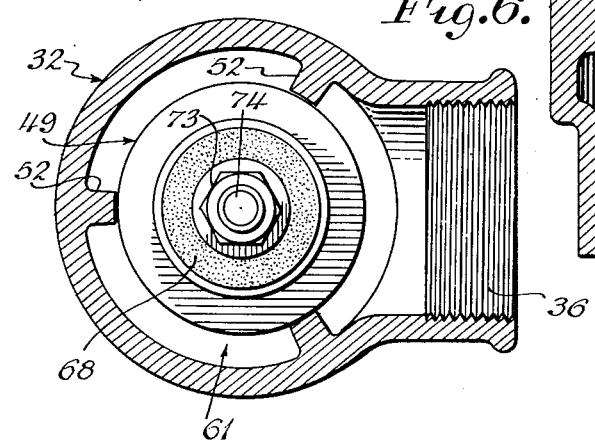
INVENTOR
MODESTO CALLEJO
BY
ATTORNEY Patented June 20, 1950

2,512,479

UNITED STATES PATENT OFFICE 2,512,479

BACKFLOW PREVENTER

Modesto Callejo, New York, N. Y.

Application February 17, 1949, Serial No. 77,029

5 Claims. (Cl. 277—21)

This invention relates to backflow preventers or vacuum breaker valves, and, more particulary, to a novel backflow preventer in which the valve parts are accessible without disconnecting conduits or the like which are in communication with the backflow preventer. Other improvements contemplated by the invention are to provide freer and more positive valve action, nonsticking but fluidtight fits for the valve action, and temperature resistance parts for one or more of the contacting valve elements.

The novel backflow preventer of the present invention comprises a two-part valve body which is so proportioned as to facilitate machining of guiding and valve surfaces, and to provide improved performance in service. The valve body houses a valve assembly composed of relatively movable parts which are designated, for the sake of convenience of description, as a plunger and a piston. Provisions for connecting the desired conduits are incorporated in one of the parts of the valve body. Simple pipe connections may be used which eliminates the necessity for unions, flanges or other special fittings which are required for gaining access to the interior of backflow preventers of the prior art. One of the parts of the valve body is removable to provide access to the valve assembly for inspection and servicing without disturbing the established conduit connections. In accordance with the invention, the removable part of the valve body receives a valve seat in the form of a separable ring.

The principal object of the invention is to provide a novel backflow preventer having parts which are readily accessible for inspection and servicing.

Another object is to provide a novel backflow preventer having a two-piece body including means for guiding a valve assembly and means for providing the desired conduit connections.

A further object is to provide a novel valve seat and valve for the atmospheric inlet channel of a backflow preventer.

Other objects and advantages of the present invention will, of course, become apparent and immediately suggest themselves to those skilled in the art to which the invention is directed from a reading of the following specification in connection with the accompanying drawings in which:

Fig. 3 is a vertical sectional view of the assembled backflow preventer of Fig. 2, showing the parts at one stage of operation;

Fig. 4 is a view similar to Fig. 3 showing the parts in another stage of operation, an additional operating position of one of the parts being shown in dot-dash outline;

Fig. 5 is a transverse section on line 5—5 of Fig. 3, the section being viewed in the direction of the arrows;

Fig. 6 is a view similar to Fig. 5, the section being taken on line 6—6 of Fig. 3; and Fig. 7 is a view similar to Fig. 3 of another embodiment of the invention.

Figure 1:
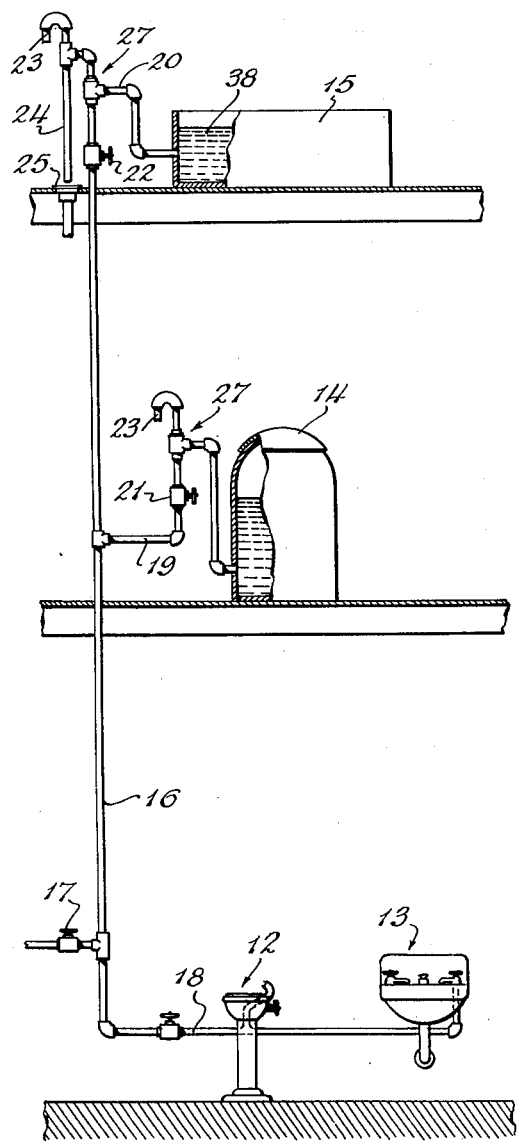
Fig. 1 is a schematic showing, partly in section, of a portion of a water distribution system including fixtures of various types, with some of which a backflow preventer of this invention is associated.
Figure 2:
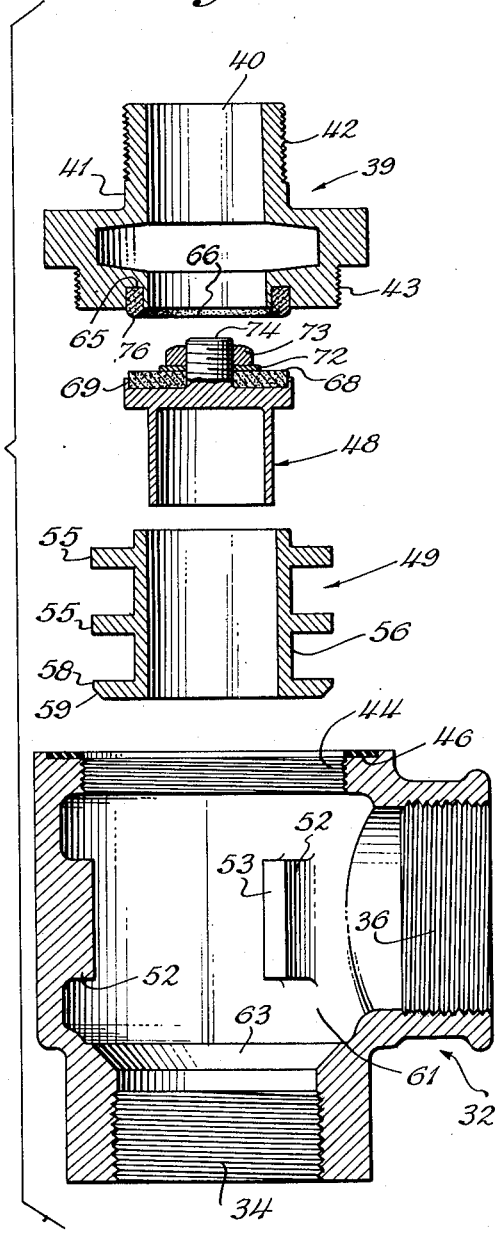
Fig. 2 is an "exploded" vertical sectional view of a backflow preventer of this invention.

In Fig. 1 of the drawing there is shown, by way of example, a water distribution system in which a plurality of fixtures, such as a drinking fountain 12, basin 13, washing machine or other industrial equipment 14, and a chemical tank or the like 15, are located on different floors of a building. The water supply for these various fixtures is conveyed thereto through a main riser pipe 16 connected to a suitable source (not shown) from which the water supply is controlled by a master valve 17. The supply for the lower fixtures 12 and 13 is conveyed thereto through a valve controlled pipe 18 in the customary manner. For the fixtures 14 and 15, there are provided branch pipes 19 and 20, respectively, with standard control valves 21 and 22 for governing the flow from the riser 16 to said fixtures. In the use of fixtures such as shown at 14 and 15, there is a possiblity of waste water being syphoned therefrom into the riser 16 when a temporary vacuum occurs in the latter, with the result that such waste water may be subsequently conveyed to other fixtures in the system. In order to avoid this contingency, a backflow preventer or vacuum breaker valve structure is interposed between each of the fixtures 14 and 15 and the control valves therefor, the construction of said vacuum breaker being such that when the fluid flow or control means thereof is operated by pressure of water in the riser 16 a free flow of the supply to the fixture will be had. However, when said supply is shut off, or a vacuum occurs in the riser, the fluid flow control means of the back flow preventer will operate to close communication between the fixture and the riser so as to eliminate any possibility of waste water in the fixture being syphoned back into the riser. For the purpose of admitting air, each of the backflow preventers 27, for example those shown in Fig. 1 of the drawing, has connected thereto an air intake pipe 23. Although not necessary or preferred in a piping system employing backflow preventers 27 of this invention, there is shown, illustratively, a pipe 24 for the backflow preventer 27 associated with the fixture 15 which is disposed over a drain 25.

Referring now to Figs. 2 to 6 of the drawing, the structure of the two part valve body or housing mentioned above of the backflow preventer 27 of this invention comprises a part 32 having conduit openings 34 and 36. The openings 34 and 36 are provided with convenient means such for example as screw threads, to provide pipe connections. The opening 34 is to be placed in communication with a water supply pipe as shown by way of example in Fig. 1 of the drawings. The opening 36 is available for connection to a fixture or appliance of any character. Two illustrative examples requiring full protection are shown in Fig. 1 of the drawings as mentioned above. The tank 15 is shown as containing a liquid 38 which may be a chemical, or combination of chemicals, such as would be used in an industrial process and such a chemical would necessarily have to be kept out of the fresh water supply line 16. In the equipment, as shown in Fig. 1 by way of example, the branch supply pipe 20 is shown as being located below the liquid level making it necessary to use a backflow preventer. The washing machine or other equipment shown schematically and indicated by reference character 14 also requires a backflow preventer to prevent contamination of the water supply since its supply pipe is or may be immersed at its outlet.

The upper part 39 of the valve body is generally of disk-like shape with an upstanding boss 41 provided with suitable conduit connecting means such as screw threads 42. The lower end of the part 39 is or may be reduced in diameter to provide a seat for a sealing gasket and is provided with screw threads 43 to provide a convenient means for coupling the part 39 to the part 32. The part 32 is provided with a somewhat enlarged internally threaded opening 44 surrounded by a more or less shallow gasket seat 46. The opening 44 permits ready insertion and removal of the movable valve assembly comprising a piston 48 and a plunger 49.

The part 32 is provided with a plurality of guide ribs 52, the lands 53 of which conform in outline to the projected outline of the plunger 49. In the illustrative arrangement, the lands 53 define a circle which is substantially equal in diameter to the outside diameter of a plurality of flanges 55 which project outwardly from the cylindrical portion 56 of the plunger 49. In the illustrative arrangement two flanges are shown, but it will be understood that this number may vary. The lower end of the plunger 49 is provided with a bottom flange 58 which serves as a valve and for that purpose is beveled, as indicated at reference character 59. The chamber or opening 61, which is provided by the structure of the part 32, has a valve seat 63 at the end of the conduit opening 34 which is machined and ground or formed in any other suitable manner intimately to receive the beveled valve surface 59. It will be noted that the opening 44 in combination with the generously proportioned valve chamber 61 permits ready preparation and machining of finished surfaces such as the valve seat 63 and the lands 53 on the ribs 52.

The part 39 is grooved as indicated at reference character 65 to accommodate an inserted ring 66 which provides a seat for the washer or valve member 68 which is seated in a recess at the upper end of the piston 48. A flange 69 projects beyond the seat for the washer 68 so as to protect its edge. The washer 68 is retained in position by a washer 72 and a nut 73 which is received on a projecting threaded stem 74 of the piston 48. The washer 72 is preferably rigid and may be made of metal. The washer 68, which comes into intimate contact with the rounded edge 76 of the inserted ring seat 66, is preferably composed of a material which is elastic and which is resistant to changing temperatures. For example, elastic materials are known and available which retain their property of elasticity without becoming adhesive in any way and which do not "flow" to any appreciable extent at these temperatures. The inserted ring 66 is preferably made of a heat resistant relatively hard material so that the combination of the elastic washer 68 and the ring seat 66 provides a firm seal under operating conditions, but one which readily parts to permit air to enter the valve chamber 61 through the central opening in the member 39 under desired operating conditions. Also, the parts act in a spring-like way when the pressure is released.

The operation of the backflow preventer embodying the invention in the form disclosed by Figs. 1 to 6 will now be described. It will be assumed, solely by way of example, that the backflow preventer 27 is installed in either of the locations shown in Fig. 1 of the drawings, for example, in connection with the chemical tank 15, so as to prevent contamination of the supply line by liquid 38. Referring to Fig. 3 of the drawings, which shows the condition of the movable parts of the valve assembly when the inlet 20 to the tank 15 is in communication with the atmospheric opening 40 and the pipe 23. Assuming this position of the parts, then on opening or starting the water flow such as by opening the valve 22, the piston 48 rises since it is actuated by the pressure of the incoming water. This condition of the parts is shown in full outline in Fig. 4 of the drawings. Movement of the piston 48 is followed substantially immediately by an upward movement of the plunger 49. The position of the plunger 49 at this time is shown in dotted outline in Fig. 4. The water from the supply line, which is under supply pressure, presses the washer 68 against the rounded edge 76 of the ring seat 66 to close the air inlet 40, thus preventing leakage of water from the pipe 23. The rising of the plunger 49 permits the water to flow up and around it in the valve chamber 61 to the outlet pipe 20 into the tank 15.

When the valve 22 is closed or if there is a reversal of water flow, or a tendency to reversal of water flow, the motion of the plunger and piston is immediately and automatically reversed, being actuated by gravity. The piston 48, when it descends, opens the air inlet 40 to admit air to the pipe 20. The plunger 49 drops so that its valve portion 58, and more particularly the beveled edge 59, thereof seats firmly on the valve seat 63. The plunger 49 thus functions as a check valve to prevent backflow. The parts are then returned to and in the condition illustrated in Fig. 3 of the drawings.

The piston 48 and the plunger 49 are self-lubricated by the flowing water when in operation. The annular flanges or fins 55 of the plunger are of uniform diameter. The larger lifting area presented by these flanges provides a larger annular inlet orifice resulting in a greater delivery capacity. The relatively small exposed friction area of the flanges permits better mechanical fits, reduces friction wear, and provides smoother and more efficient operation of the plunger in the vertical guides.

One important function of a backflow preventer is to admit air under backflow conditions, that is, when a partial vacuum or pressure drop occurs in the supply piping. This air, in the backflow preventer embodying the invention in the form of Figs. 1 to 6, is admitted through the air inlet 40 which while the backflow preventer is under positive pressure, is normally closed to prevent leakage. This air opening inlet 40 should immediately and automatically open the instant the pressure becomes negative, that is to say, when a partial vacuum occurs. A backflow preventer, constructed in accordance with this invention having the valve seat 66 and the valve washer 68, opens immediately to admit air. There is no adhesion or "freezing" of the seating parts even though the backflow preventer is under continuous pressure for a considerable period of time. The particular combination disclosed of the air inlet ring seat and the elastic piston washer does not permit "vulcanization" or "freezing" even after prolonged periods of closure under continuous water pressure. This is an important feature and is especially important where a large sealing force is developed to close the air inlet.

Fig. 7 of the drawings shows another embodiment of the backflow prevent of this invention in which the plunger is of modified construction. Referring now to Fig. 7, it will be seen that the valve parts 32a and 39a are similar to the corresponding parts 32 and 39, of Figs. 1 to 6 of the drawings. For this reason, these reference characters and those applicable to other parts which are similar to corresponding parts in Figs. 1 to 6 will be designated by the same reference characters with the suffix "a." The piston 48a is or may be similar in all respects to the piston 48 of Figs. 1 to 6 and it may be provided with the same type of valve washer 68a for cooperation with a valve ring seat 66a.

The plunger 86 which slidably receives the piston 48a is composed of two substantially coaxial sleeve-like portions 88 and 89 which are joined by a radially extending annular portion 91. The top surface of the annular portion 91 provides a rest or a stop for the enlarged head of the piston 48a, which carries the washer 68a. The lower edge of the sleeve-like portion 89 is beveled as indicated at 93 so as to cooperate with the valve seat 63a. The plunger 86 may be fabricated from tubing which is brazed together. For example, the sleeve-like portions 88 and 89 may be short lengths of tubing brazed to a flat ring 91 or one of these sleeve-like parts may be spun at its end to provide radial displacement so that it may be brazed to the other sleeve-like part. The plunger 86 of Fig. 7 is suitable for use when the backflow preventer of this invention is installed in a low pressure line. The tubular construction illustrated by Fig. 7 of the drawings is much lighter in weight than the plunger 49 of Figs. 1 to 6.

What is claimed is:

1. A backflow preventer comprising a housing, said housing having means for connecting a supply conduit thereto and means for connecting an outlet conduit thereto to provide a flow of liquid to a fixture, a valve assembly comprising a piston and a plunger in said housing, said plunger being movable to establish communication between said supply conduit connecting means and said outlet conduit connection means, said plunger having a plurality of flanges thereon, said flanges being exposed to the pressure of liquid existing at said means for connecting a supply conduit, and a plurality of fins in said housing for guiding said flanged member.

2. A backflow preventer comprising a two-part valve housing, one of said parts having an opening and providing a valve chamber, means to conduct fluid under pressure to said valve chamber from a supply conduit, a valve seat associated with said means, means to conduct fluid from said valve chamber to a fluid utilizing fixture, a plunger movable in said valve chamber into and out of engagement with said valve seat in response to changes in fluid pressure, the projected outline of said plunger being smaller than the opening in said valve chamber, the other of said parts of said housing serving as a closure for the open side of said valve chamber, means in said other part to provide an atmospheric inlet, a piston nested in said plunger for controlling said atmospheric inlet, and means for detachably connecting said valve housing parts.

3. A backflow preventer comprising a valve housing providing a valve chamber, a valve assembly in said housing, said assembly comprising a nested piston and plunger, guide ribs in said housing having bearing surfaces, said plunger having a plurality of radially extending guide flanges thereon, an opening in said valve housing into said chamber, a closure for said opening in said valve housing, and an air inlet in said closure, said valve assembly being removable through said opening.

4. A backflow preventer comprising a two-part valve housing, one of said parts providing a valve chamber, a valve assembly for said blackflow preventer, said assembly comprising a nested piston and plunger, guide ribs in said valve chamber part having bearing surfaces, said plunger having a plurality of radially extending guide flanges thereon, an opening in said valve chamber part into said chamber, the other of said parts serving as a closure for said opening in said valve chamber part, an air inlet in said other part, said valve assembly being removable through said opening.

5. A backflow preventer comprising a valve housing providing a valve chamber, a valve assembly in said housing, said assembly comprising a nested piston and plunger, guide ribs in said housing having bearing surfaces, said plunger being composed of inner and outer coaxial parts, an annular part joining coaxial parts, an opening in said valve housing into said chamber, a closure for said opening in said valve housing, and an air inlet in said closure, said valve assembly being removable through said opening.

MODESTO CALLEJO.

REFERENCES CITED

The following references are of record in the file of this patent:

UNITED STATES PATENTS

| Number | Name | Date |
| --- | --- | --- |
| 40,723 | Gilson | Nov. 24, 1863 |
| 1,519,668 | Costello | Dec. 16, 1924 |
| 1,653,996 | Estep | Dec. 27, 1927 |
| 1,737,529 | Viele | Nov. 26, 1929 |
| 1,990,371 | Chadwick | Feb. 5, 1935 |
| 2,138,000 | Ehlers | Nov. 29, 1938 |

FOREIGN PATENTS

| Number | Country | Date |
| --- | --- | --- |
| 239,281 | Great Britain | Sept. 4, 1925 |